United States Patent
Xiao et al.

(10) Patent No.: US 10,733,101 B2
(45) Date of Patent: Aug. 4, 2020

(54) PROCESSING NODE, COMPUTER SYSTEM, AND TRANSACTION CONFLICT DETECTION METHOD

(71) Applicant: Huawei Technologies Co., Ltd., Shenzhen (CN)

(72) Inventors: Hao Xiao, Nanjing (CN); Yuangang Wang, Shenzhen (CN); Jun Xu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/047,892

(22) Filed: Jul. 27, 2018

(65) Prior Publication Data
US 2018/0373634 A1    Dec. 27, 2018

Related U.S. Application Data

(63) Continuation of application No. PCT/CN2017/071734, filed on Jan. 19, 2017.

(30) Foreign Application Priority Data

Jan. 29, 2016   (CN) .......................... 2016 1 0067776

(51) Int. Cl.
*G06F 12/0815*   (2016.01)
*G06F 9/46*   (2006.01)
(Continued)

(52) U.S. Cl.
CPC ............ *G06F 12/0815* (2013.01); *G06F 9/46* (2013.01); *G06F 9/467* (2013.01); *G06F 9/52* (2013.01);
(Continued)

(58) Field of Classification Search
CPC .. G06F 12/0815; G06F 9/467; G06F 2212/50; G06F 12/0833; G06F 2212/283;
(Continued)

(56) References Cited

U.S. PATENT DOCUMENTS 8,566,533 B1 * 10/2013 Garg ................... G06F 12/0815
                                                                         711/121
8,667,231 B2    3/2014 Heller, Jr.
(Continued)

FOREIGN PATENT DOCUMENTS

CN      101308462 A      11/2008
CN      102483704 A       5/2012
(Continued)

OTHER PUBLICATIONS

Machine Translation and Abstract of Chinese Publication No. CN102483704, May 30, 2012, 23 pages.
(Continued)

*Primary Examiner* — Charles Rones
*Assistant Examiner* — Tong B. Vo
(74) *Attorney, Agent, or Firm* — Conley Rose, P.C.

(57) ABSTRACT

A processing node, a computer system, and a transaction conflict detection method, where the processing node includes a processor and a transactional cache. When obtaining a first operation instruction in a transaction for accessing shared data, the processor accesses the transactional cache for caching shared data of a transaction processed by the processing node. If the transactional cache determines that the first operation instruction fails to hit a cache line in the transactional cache, the transactional cache sends a first destination address in the operation instruction to a transactional cache in another processing node. After receiving status information of a cache line hit by the first destination address from the other processing node, the transactional
(Continued)

cache determines, based on the received status information, whether the first operation instruction conflicts with a second operation instruction executed by the other processing node.

18 Claims, 8 Drawing Sheets

(51) Int. Cl.
*G06F 9/52* (2006.01)
*G06F 12/0806* (2016.01)
*G06F 12/0831* (2016.01)

(52) U.S. Cl.
CPC ...... *G06F 12/0806* (2013.01); *G06F 12/0833* (2013.01); *G06F 2212/27* (2013.01); *G06F 2212/283* (2013.01); *G06F 2212/50* (2013.01); *G06F 2212/62* (2013.01)

(58) Field of Classification Search
CPC ............. G06F 2212/27; G06F 2212/62; G06F 12/0806; G06F 9/46; G06F 9/52; G06F 9/526
See application file for complete search history.

(56) References Cited

U.S. PATENT DOCUMENTS

| | | | |
|---|---|---|---|
| 8,683,143 | B2 | 3/2014 | Akkary et al. |
| 8,924,653 | B2 | 12/2014 | Gaither et al. |
| 2005/0160238 | A1* | 7/2005 | Steely, Jr. ........... G06F 12/0831 711/145 |
| 2007/0136289 | A1 | 6/2007 | Adl-Tabatabai et al. |
| 2008/0288727 | A1 | 11/2008 | Baum et al. |
| 2012/0310987 | A1* | 12/2012 | Dragojevic ............. G06F 9/467 707/792 |
| 2012/0331234 | A1* | 12/2012 | Hirao .................... G06F 12/084 711/135 |
| 2016/0283379 | A1* | 9/2016 | Samanta ............... G06F 12/128 |

FOREIGN PATENT DOCUMENTS

| | | |
|---|---|---|
| CN | 102521028 A | 6/2012 |
| CN | 103092788 A | 5/2013 |
| CN | 103500108 A | 1/2014 |
| CN | 104536916 A | 4/2015 |
| EP | 1221095 B1 | 4/2004 |

OTHER PUBLICATIONS

Machine Translation and Abstract of Chinese Publication No. CN102521028, Jun. 27, 2012, 16 pages.
Machine Translation and Abstract of Chinese Publication No. CN103500108, Jan. 8, 2014, 37 pages.
Machine Translation and Abstract of Chinese Publication No. CN104536916, Apr. 22, 2015, 24 pages.
Foreign Communication From a Counterpart Application, PCT Application No. PCT/CN2017/071734, English Translation of International Search Report dated Apr. 25, 2017, 2 pages.
Foreign Communication From a Counterpart Application, PCT Application No. PCT/CN2017/071734, English Translation of Written Opinion dated Apr. 25, 2017, 5 pages.
Foreign Communication From a Counterpart Application, European Application No. 17743651.6, Extended European Search Report dated Jan. 3, 2019, 8 pages.

* cited by examiner

PROCESSING NODE, COMPUTER SYSTEM, AND TRANSACTION CONFLICT DETECTION METHOD

CROSS-REFERENCE TO RELATED APPLICATIONS

This application is a continuation of International Patent Application No. PCT/CN2017/071734 filed on Jan. 19, 2017, which claims priority to Chinese Patent Application No. 201610067776.4 filed on Jan. 29, 2016. The disclosures of the aforementioned applications are hereby incorporated by reference in their entireties.

TECHNICAL FIELD

The present disclosure relates to the field of computer technologies, and in particular, to a processing node, a computer system, and a transaction conflict detection method.

BACKGROUND

Transactional memory is a concurrent programming manner in a computer architecture, and is used to implement consistency of data shared by a plurality of processes. A transaction originates from a concept of transaction in a database management system (DBMS). A transaction is an instruction series, including a read operation and a write operation on storage. In the DBMS, the transaction needs to meet atomicity, consistency, isolation, and durability. Atomicity states that either all actions in the transaction are performed, or none are performed. Consistency states that a database needs to be in a consistent state at any time, that is, needs to meet some preset conditions. Isolation states that a status of an internal object in a transaction that is not committed is not visible to another transaction. Durability states that a change made to a database system by a committed transaction is permanent. A key of the transactional memory is to provide a critical region operation that has atomicity, consistency, and isolation such that a plurality of processes can securely access shared data without using a lock. Currently, the transactional memory has two implementations software transactional memory (STM) based on software and hardware transactional memory (HTM) based on hardware.

HTM in other approaches is generally implemented on a level 1, level 2, or level 3 cache of a central processing unit (CPU). For example, transaction conflict detection and transaction rollback mechanisms are implemented by adding a dedicated cache mechanism in the level 1 cache (also referred to as L1 cache). Further, during access of a process, whether a cache line is being operated by another process is determined by tracking all cache lines that are read or written during execution of a transaction. When it is detected that the transaction of the process conflicts with a transaction of the other process, execution of the transaction needs to be terminated. The cache line is used to indicate a segment of consecutive addresses, and the cache line may also be referred to as a data block. In some computer systems, a size of a cache line is 64 bytes. Because tracking detection is performed on all operated cache lines in such an implementation of the transactional memory, high system power consumption is caused. In addition, a detection granularity is relatively coarse, easily causing misdetection.

SUMMARY

A processing node, a computer system, and a transaction conflict detection method that are provided in this application can improve address conflict detection efficiency and reduce system power consumption, in addition to saving system resources.

According to a first aspect, this application provides a processing node, where the processing node includes a processing unit and a transactional cache, and the transactional cache is connected to the processing unit using a first interface. When the processing unit obtains an operation instruction in a transaction and determines that the operation instruction is an instruction of a transaction for accessing shared data, the processing unit accesses the transactional cache according to the operation instruction, where the operation instruction carries a destination address, the transactional cache is configured to cache shared data of a transaction that is being processed by the processing node, and the shared data is data that can be accessed by both the processing node and another processing node. If the transactional cache determines that the destination address fails to hit a cache line in the transactional cache, the transactional cache sends the destination address to a transactional cache in the other processing node, and receives status information that is of a cache line hit by the destination address and that is returned by the transactional cache in the other processing node. The shared data is cached in the cache line hit by the destination address, and the status information is used to indicate an access status of the shared data in the transactional cache in the other processing node. Further, the transactional cache determines, based on the status information received by the transactional cache, whether the operation instruction conflicts with an operation instruction that is being executed by the other processing node.

According to the processing node provided in this application, the transactional cache that is specially configured to cache shared data to be accessed by a current transaction is provided such that transaction conflict detection does not need to be performed on an operation instruction that does not access the shared data, and system power consumption during operation instruction processing of a system is reduced. In addition, in comparison with an existing cache, the transactional cache stores a relatively small amount of data, and a relatively small amount of data needs to be traversed in a conflict detection process such that detection efficiency can be improved.

In a possible implementation, the processing node further includes a normal cache, where the normal cache is connected to the processing unit using a second interface, the first interface and the second interface are different communications interfaces, and the normal cache is configured to cache data being processed by the processing node except the shared data of the transaction. According to this manner, when the operation instruction received by the processing unit in the processing node is not an operation instruction in the transaction for accessing the shared data, the processing unit accesses the normal cache. Because data cached in the normal cache is data except the shared data of the transaction, the normal cache does not need to perform transaction conflict detection such that processing efficiency of the system can be improved.

In another possible implementation, when the status information received by the transactional cache is status information indicating a modified state, the transactional cache determines that the operation instruction conflicts with the operation instruction that is being executed by the other processing node, where the modified state is used to indicate that the shared data is being modified by the other processing node.

In another possible implementation, when the operation instruction is a read operation instruction, and the status information is status information indicating a shared state, the transactional cache determines that the operation instruction does not conflict with the operation instruction that is being executed by the other processing node, where the shared state is used to indicate that the shared data is consistent with data in the internal memory.

In another possible implementation, when the operation instruction is a write operation instruction, and the status information is status information indicating a shared state, the transactional cache determines that the operation instruction conflicts with the operation instruction that is being executed by the other processing node, where the shared state is used to indicate that the shared data is consistent with data in the internal memory.

With reference to any one of the foregoing possible implementations, in another possible implementation, a size of the cache line in the transactional cache is one word. According to the processing node provided in this application, the cache line in the transactional cache is set to be relatively small, and a conflict detection granularity is relatively fine such that an implementation process of transaction conflict detection according to the processing node provided in this application has higher detection precision. This is more beneficial to system performance improvement.

With reference to any one of the foregoing possible implementations, in another possible implementation, each cache line in the transactional cache includes the following information of data, status, and pointer information of another processing node that accesses the cache line. Therefore, the processing node can return a status of the cache line to another transactional cache based on the status information recorded in the cache line, and can obtain, based on the pointer information of the other processing node that accesses the cache line, a sequence in which different processing nodes access the cache line.

With reference to any one of the foregoing possible implementations, in another possible implementation, the processing unit may determine, based on an instruction identifier bit in the operation instruction, whether the obtained operation instruction is the instruction of the transaction for accessing the shared data.

In another possible implementation, the processing unit may determine, based on the destination address in the operation instruction and a list of addresses storing the shared data, whether the operation instruction is the operation instruction in the transaction for accessing the shared data.

In another possible implementation, after the transactional cache sends the destination address to the transactional cache in the other processing node, if data of the destination address is not cached in a processing node in the other processing node, the processing node may not return a response message to the transactional cache such that an amount of information transmitted between nodes can be reduced.

According to a second aspect, this application provides a processing node, where the processing node includes a processing unit and a transactional cache, and the transactional cache is connected to the processing unit using a first interface. When the processing unit obtains an operation instruction in a transaction and determines that the operation instruction is an instruction of a transaction for accessing shared data, the processing unit accesses the transactional cache according to the operation instruction, where the operation instruction carries a destination address, the transactional cache is configured to cache shared data of a transaction that is being processed by the processing node, and the shared data is data that can be accessed by both the processing node and another processing node. If the transactional cache determines that the destination address hits a cache line in the transactional cache, and the operation instruction is a write operation instruction, the transactional cache further determines a status of the cache line hit by the destination address. If the status of the cache line hit by the destination address is a shared state, and the processing node is the first processing node that accesses the shared data, the transactional cache writes to-be-written data into the cache line according to the operation instruction.

According to the processing node provided in this application, the transactional cache that is specially configured to cache shared data to be accessed by a current transaction is provided such that transaction conflict detection does not need to be performed on an operation instruction that does not access the shared data, and system power consumption during operation instruction processing of a system is reduced. In addition, in comparison with an existing cache, the transactional cache stores a relatively small amount of data, and a relatively small amount of data needs to be traversed in a conflict detection process such that detection efficiency can be improved. Further, according to the processing node provided in this application, when the destination address in the operation instruction hits the cache line in the transactional cache and the operation instruction is a write operation instruction, whether the processing node executing the operation instruction conflicts with another processing node that is accessing the cache line can be determined based on an access sequence in which a plurality of processing nodes access the cache line such that data consistency can be ensured. In addition, according to this manner, a processing sequence of transactions running on different processing nodes that access same shared data in a computer system can be ensured such that access of the processing nodes can be normally performed in an access sequence, thereby avoiding a problem that a processing node that accesses the shared data earlier cannot normally process a transaction because the shared data is modified by a processing node that accesses the shared data later.

In a possible implementation, the transactional cache is configured to determine, based on an access linked list of the cache line, that the processing node is the first processing node that accesses the cache line, where the access linked list is used to indicate a sequence in which a plurality of processing nodes read the shared data.

In another possible implementation, each cache line in the transactional cache includes the following information of data, status, and pointer information of another processing node that accesses the cache line. An access linked list of a cache line can be obtained based on pointer information of another processing node that accesses the cache line, and a sequence in which different processing nodes access the cache line can be determined. A sequence in which different processing nodes read shared data in the cache line can be determined based on the access linked list.

In another possible implementation, the processing node further includes a normal cache, where the normal cache is connected to the processing unit using a second interface, the first interface and the second interface are different communications interfaces, and the normal cache is configured to cache data being processed by the processing node except the shared data of the transaction.

With reference to any one of the second aspect and the possible implementations of the second aspect, in another possible implementation, a size of the cache line in the transactional cache is one word. According to the processing node provided in this application, the cache line in the transactional cache is set to be relatively small, and a conflict detection granularity is relatively fine such that an implementation process of transaction conflict detection according to the processing node provided in this application has higher detection precision. This is more beneficial to system performance improvement.

With reference to any one of the foregoing possible implementations, in another possible implementation, the processing unit may determine, based on an instruction identifier bit in the operation instruction, whether the obtained operation instruction is the instruction of the transaction for accessing the shared data.

In another possible implementation, the processing unit may determine, based on the destination address in the operation instruction and a list of addresses storing the shared data, whether the operation instruction is the operation instruction in the transaction for accessing the shared data.

According to a third aspect, this application provides a computer system, where the computer system includes at least two processing nodes according to any one of the first aspect and any possible implementation of the first aspect.

According to a fourth aspect, this application provides a computer system, where the computer system includes at least two processing nodes according to any one of the second aspect and any possible implementation of the second aspect.

According to a fifth aspect, this application provides a transaction conflict detection method applied to a computer system, where the method is performed by the transactional cache in the processing node provided in the first aspect, and can implement a function implemented by the transactional cache in the processing node provided in the first aspect.

According to a sixth aspect, this application provides another transaction conflict detection method applied to a computer system, where the method is performed by the transactional cache in the processing node provided in the second aspect, and can implement a function implemented by the transactional cache in the processing node provided in the second aspect.

According to a seventh aspect, this application provides a transaction conflict detection apparatus, where the apparatus is applied to a multi-core computer system that includes a plurality of processing nodes, and the apparatus includes modules configured to implement the method according to the fifth aspect.

According to an eighth aspect, this application provides a transaction conflict detection apparatus, where the apparatus is applied to a multi-core computer system that includes a plurality of processing nodes, and the apparatus includes modules configured to implement the method according to the sixth aspect.

According to a ninth aspect, this application provides a computer program product, including a computer readable storage medium storing program code, where an instruction included in the program code is used to perform the method according to the fifth aspect.

According to a tenth aspect, this application provides a computer program product, including a computer readable storage medium storing program code, where an instruction included in the program code is used to perform the method according to the sixth aspect.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure.

DESCRIPTION OF EMBODIMENTS

To make a person skilled in the art better understand the technical solutions in the present disclosure, the following describes the technical solutions in the embodiments of the present disclosure with reference to the accompanying drawings in the embodiments of the present disclosure. The described embodiments are merely some but not all of the embodiments of the present disclosure.

Figure 1:
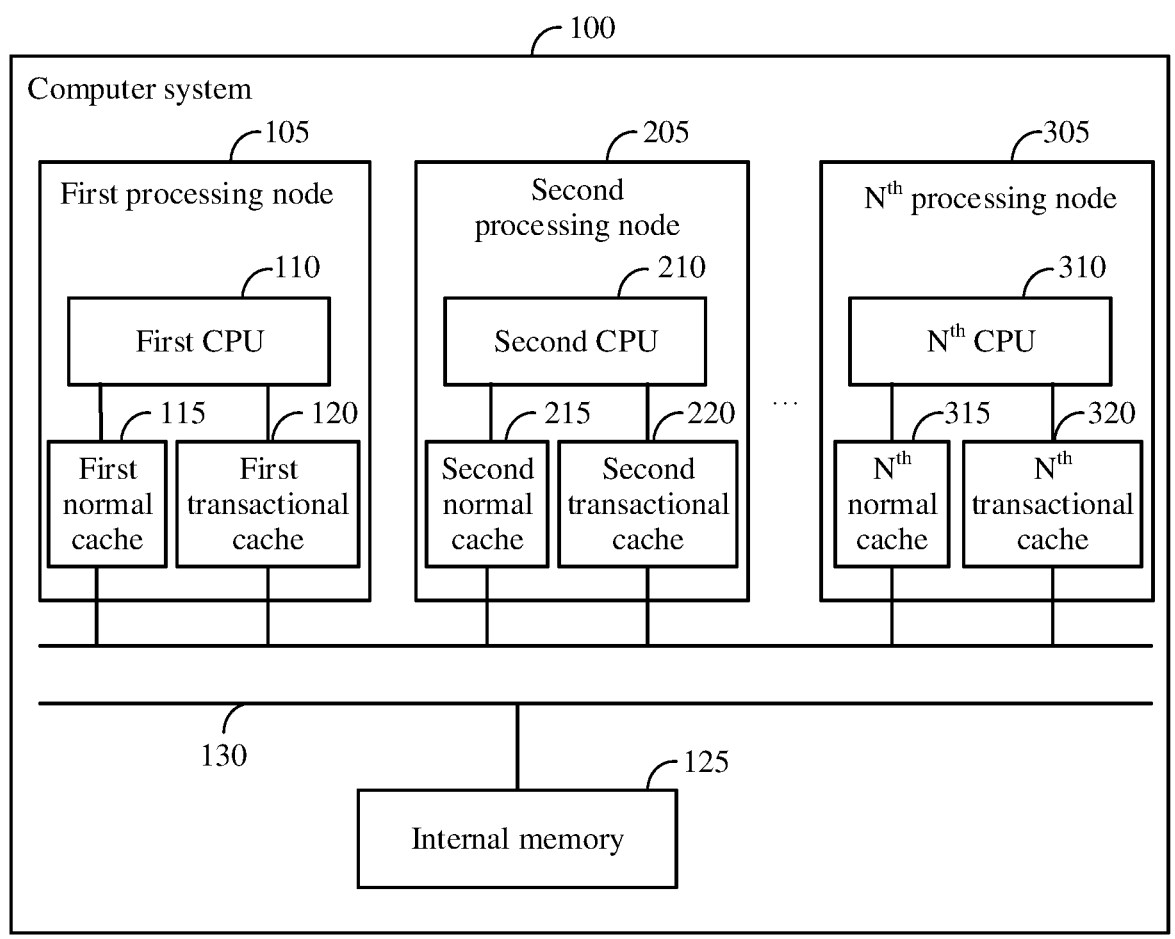
FIG. 1 is a schematic structural diagram of a computer system according to an embodiment of the present disclosure.

FIG. 1 is a schematic structural diagram of a computer system 100 according to an embodiment of the present disclosure. As shown in FIG. 1, the computer system 100 includes a plurality of processing nodes. As shown in FIG. 1, the plurality of processing nodes may include a first processing node 105, a second processing node 205, and an $N^{th}$ processing node 305. It may be understood that, FIG. 1 shows merely N processing nodes, where N is a natural number that is not less than 3. In an embodiment, the computer system 100 may include two processing nodes. The processing nodes, for example, the first processing node 105, the second processing node 205, and the $N^{th}$ processing node 305, are connected to each other using an on-chip interconnect 130. All the processing nodes are connected to an internal memory 125 using the on-chip interconnect 130. The on-chip interconnect 130 may include a network-on-chip, a system bus, and the like. Each processing node includes a CPU, a normal cache, and a transactional cache. For example, the first processing node 105 includes a first CPU 110, a first normal cache 115, and a first transactional cache 120, and the second processing node 205 includes a second CPU 210, a second normal cache 215, and a second transactional cache 220. In this embodiment of the present disclosure, a normal cache may be referred to as an Ncache, and a transactional cache may be referred to as a Tcache. As shown in FIG. 1, for clear description, an internal structure of each processing node is described below in detail using the first processing node 105 as an example.

The first CPU 110 is a computing core and a control unit of the first processing node 105. The first CPU 110 may be an integrated circuit. The first CPU 110 can implement access to the internal memory 125, the first normal cache 115, the first transactional cache 120, and a magnetic disk. It may be understood that, in this embodiment of the present disclosure, the first CPU 110 is merely an example of a processing unit in the first processing node 105. In addition to the first CPU 110, the processing unit may be a processor core or another application-specific integrated circuit (ASIC), or may be one or more integrated circuits that are configured to implement this embodiment of the present disclosure.

A person skilled in the art knows that a cache is a temporary memory between the CPU and the internal memory in the computer system. Generally, the cache includes a static random access memory (RAM) (SRAM). Due to a relatively high rate of the cache, the cache is used for high-speed data exchange with the CPU. Data in the cache is a part of data in the internal memory. When the CPU accesses data, the CPU first searches the cache, and only when the cache has no data needed by the CPU, the CPU accesses the internal memory, thereby accelerating an access rate of the CPU. Further, the cache includes a control component and a storage medium, and the control component in the cache may return, to the CPU according to an operation instruction of the CPU, data cached in the storage medium in the cache. The control component in the cache may further cache to-be-written data into the storage medium of the cache according to a write operation instruction of the CPU.

In this embodiment of the present disclosure, caches in each processing node include a normal cache and a transactional cache. For example, caches in the first processing node 105 may include the first normal cache 115 and the first transactional cache 120. The first normal cache 115 and the first transactional cache 120 may be a level 1 cache (also referred to as L1 cache), a level 2 cache (also referred to as L2 cache), or a level 3 cache (also referred to as L3 cache) in an existing processor. Alternatively, the first transactional cache 120 may include an SRAM and dedicated control logic. The first normal cache 115 and the first transactional cache 120 are independent of each other. The first normal cache 115 and the first transactional cache 120 are separately connected to the first CPU 110 using independent memory interfaces. In this embodiment of the present disclosure, both the first normal cache 115 and the first transactional cache 120 are level 1 caches. There may also be a level 2 cache or a level 3 cache between the two caches (including the normal cache 115 and the transactional cache 120) and the internal memory 125. The first transactional cache 120 is configured to process an operation instruction in a transaction for accessing shared data. The first normal cache 115 is configured to process an operation instruction for accessing non-shared data other than the shared data. For example, the first normal cache 115 may process a non-transactional operation, and may also process an access operation on the non-shared data in the transaction. The first transactional cache 120 is configured to cache the shared data that can be accessed by a plurality of processes, and the first normal cache 115 is configured to cache data other than the shared data. The first transactional cache 120 has no independent address space, and an address of data in the first transactional cache 120 is obtained by mapping an address in the internal memory 125. An address of any piece of shared data in the first transactional cache 120 is the same as an address thereof in the internal memory 125.

It may be understood that, during actual application, there is no limitation on whether the first transactional cache 120 and the first normal cache 115 are completely physically isolated, provided that the first transactional cache 120 and the first normal cache 115 are connected to and communicate with the first CPU 110 using different data channels. For example, in a possible implementation, the first transactional cache 120 and the first normal cache 115 may be two physically-independent entities, and are connected to and communicate with the first CPU 110 using independent interfaces. In another possible implementation, the first transactional cache 120 and the first normal cache 115 may be two different storage spaces in a same cache, and the two different storage spaces communicate with the first CPU 110 using different interfaces. In another possible implementation, the first transactional cache 120 and the first normal cache 115 may be two different storage spaces in a same cache, and the two different storage spaces communicate with the first CPU 110 using two data channels that are implemented by multiplexing one physical interface in a time-division manner.

The internal memory 125 may also be referred to as a main memory, and is a storage space that can be directly addressed by the first CPU 110. The internal memory 125 is mainly used to store a program and data. In this embodiment of the present disclosure, the internal memory 125 may be a dynamic RAM (DRAM), or may be a storage class memory such as a phase change memory (PCM), a resistive RAM (RRAM), a magnetic RAM (MRAM), or a ferroelectric RAM (FRAM). In this embodiment of the present disclosure, a specific type of the internal memory 125 is not limited.

Figure 2:
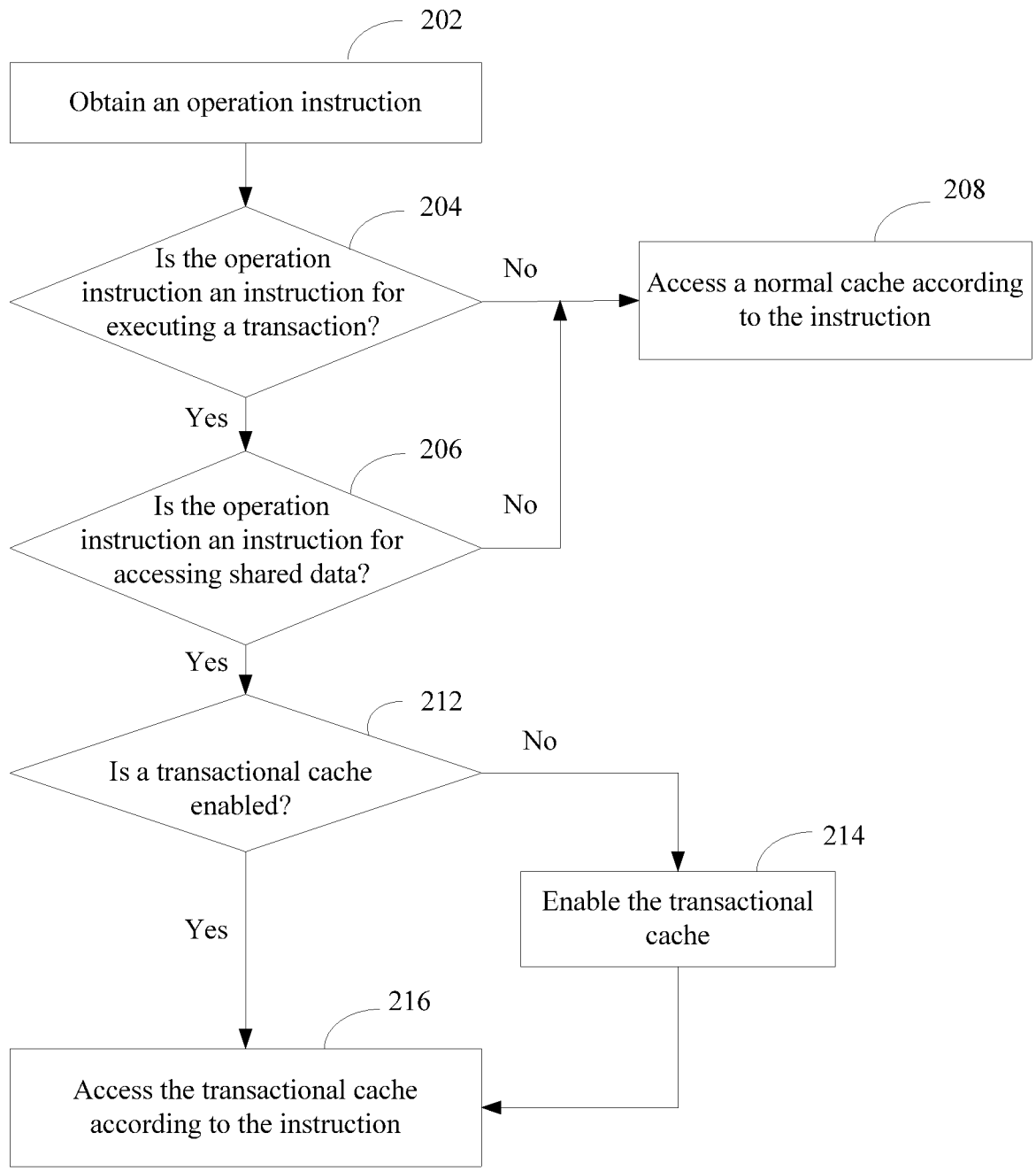
FIG. 2 is a flowchart of processing an operation instruction according to an embodiment of the present disclosure.

A person skilled in the art may know that, the first CPU 110 may execute a plurality of types of instructions. For example, the instruction may be an instruction for accessing data, or may be an instruction for calling a program. A transaction is an instruction series, including a read operation instruction and/or a write operation instruction on storage. It may be understood that, the storage herein includes an internal memory and an external memory (for example, a magnetic disk). In the other approaches, because there is only one cache, all instructions are processed by accessing a same cache. However, in this embodiment of the present disclosure, as shown in FIG. 1, the computer system 100 differs from an existing computer system in architecture. In the computer system 100 provided in this embodiment of the present disclosure, caches are divided into the first normal cache 115 and the first transactional cache 120, and the first normal cache 115 and the first transactional cache 120 separately communicate with the first CPU 110 using different independent memory interfaces. Therefore, in this embodiment of the present disclosure, the first CPU 110 needs to process different instructions by accessing different caches. With reference to FIG. 2, the following briefly describes a procedure of processing an operation instruction using the computer system 100 provided in FIG. 1.

FIG. 2 is a flowchart of processing an operation instruction according to an embodiment of the present disclosure. For ease of description, the following uses the first processing node 105 as an example for description. It may be understood that, a processing procedure in an operation instruction execution process of another processing node is similar to that of the first processing node 105.

As shown in FIG. 2, after the first CPU 110 in the first processing node obtains an operation instruction (refer to step 202), in step 204, the first CPU 110 determines whether the operation instruction is a transactional operation instruction. Further, in this embodiment of the present disclosure, the first CPU 110 may determine, based on a value of a transaction register of the first CPU 110, whether the operation instruction received by the first CPU 110 is the transactional operation instruction. A person skilled in the art may know that, a transaction register may be disposed in a CPU, and the transaction register is configured to indicate whether an instruction processed by the CPU is a transactional instruction. When a transaction starts, the CPU may set a value of the transaction register to "1" to indicate that the CPU enters a transaction processing stage and the instruction processed by the CPU is a transactional operation instruction. When the transaction ends, the CPU may set the value of the transaction register to "0" to indicate that the CPU ends processing of the current transaction. It may be understood that, "1" or "0" is merely a value of a transaction identifier bit exemplified in this embodiment of the present disclosure. During actual application, other values may also be used to identify a start of a transaction and an end of the transaction. In this embodiment of the present disclosure, after the first CPU 110 obtains an operation instruction, the first CPU 110 may determine, based on the value of the transaction register, whether the currently obtained operation instruction is an operation instruction in a transaction. If the value of the transaction register shows that the first CPU 110 is currently in the transaction processing stage, the first CPU 110 determines that the obtained operation instruction is the transactional operation instruction. The transactional operation instruction may include a read operation instruction and a write operation instruction. For example, the operation instruction obtained by the first CPU 110 may be an operation instruction 302 shown in FIG. 3.

When the first CPU 110 determines that the operation instruction 302 is the transactional operation instruction, the first CPU 110 may further determine whether the operation instruction 302 is an instruction for accessing shared data (refer to step 206). In this embodiment of the present disclosure, the shared data is data that can be accessed by a plurality of processes or threads. In this embodiment of the present disclosure, the shared data may also be referred to as a key variable. In this embodiment of the present disclosure, the first transactional cache 120 is configured to cache only shared data that needs to be accessed in a transaction execution process. When the operation instruction 302 is the instruction for accessing the shared data, the first CPU 110 accesses the first transactional cache 120 in the first processing node 105 according to the operation instruction 302. When the operation instruction 302 is a non-transactional operation instruction, the first CPU 110 accesses the first normal cache 115 in the first processing node 105 according to the operation instruction 302 (refer to step 208). Further, the first CPU 110 can determine, based on an instruction identifier bit in the operation instruction 302, whether the operation instruction 302 is the operation instruction for accessing the shared data, where the instruction identifier bit is used to indicate an instruction type of the operation instruction. The instruction type of the operation instruction may be identified by setting a value of the instruction identifier bit. A person in the art may know that, the operation instruction generally has 32 bits, of which 5 bits are instruction identifier bits that are used to identify the instruction type. For example, a value "00000" of the instruction identifier bits is used to indicate that the instruction is a common read/write instruction, for example, a load instruction or a store instruction. In this case, the first CPU 110 determines that the operation instruction 302 is not the operation instruction in the transaction for accessing the shared data. A value "00001" of the instruction identifier bits is used to indicate that the instruction is an instruction in the transaction for accessing the shared data, for example, a tran_load instruction or a tran_store instruction. In this case, the first CPU 110 determines that the operation instruction 302 is the operation instruction in the transaction for accessing the shared data.

The first CPU 110 may also directly determine, based on the instruction identifier bits in the operation instruction, whether the obtained operation instruction is the operation instruction in the transaction for accessing the shared data. For example, when a value of the instruction identifier bits in the operation instruction obtained by the first CPU 110 indicates that the operation instruction is the tran_load or tran_store instruction, the first CPU 110 determines that the operation instruction 302 is the operation instruction in the transaction for accessing the shared data. When a value of the instruction identifier bits in the operation instruction obtained by the first CPU 110 indicates that the operation instruction is not the tran_load or tran_store instruction, the first CPU 110 determines that the operation instruction 302 is not the operation instruction in the transaction for accessing the shared data. In another case, the first CPU 110 may also determine, based on a destination address in the operation instruction 302 and a list of addresses storing the shared data, whether the operation instruction 302 is the operation instruction in the transaction for accessing the shared data.

When the first CPU 110 determines that the operation instruction 302 is the operation instruction in the transaction for accessing the shared data, the first CPU 110 accesses the first transactional cache 120 according to the operation instruction 302. In a process in which the first CPU 110 accesses the first transactional cache 120 according to the operation instruction 302, the first CPU 110 further determines whether the first transactional cache 120 has been enabled (as shown in step 212). In this embodiment of the present disclosure, the first transactional cache 120 has an enable identifier bit on hardware, for example, "0" and "1", where "0" is used to indicate that the first transactional cache 120 is in a disabled state, and "1" is used to indicate that the first transactional cache 120 is in an enabled state. The first transactional cache 120 may be enabled when the first CPU 110 needs to access the shared data in the transaction execution process. A person skilled in the art knows that, the transaction includes a series of ordered instructions. In this embodiment of the present disclosure, in the transaction execution process, when the first CPU 110 executes the first operation instruction for accessing the shared data, the first CPU 110 enables the first transactional cache 120. After all instructions of the transaction have been executed, the first CPU 110 may disable the first transactional cache 120. In this embodiment of the present disclosure, in step 212, if the first transactional cache 120 has been enabled, the first CPU 110 may directly access the first transactional cache 120 according to the operation instruction (as shown in step 216). If the first transactional cache 120 has not been enabled, it indicates that the to-be-executed operation instruction 302 is the first operation instruction for accessing the shared data in the transaction execution process. In this case, as shown in step 214, the first CPU 110 needs to enable the first transactional cache 120. After the first transactional cache 120 is enabled, the first CPU 110 may access the first transactional cache 120 according to the operation instruction 302 (as shown in step 216).

A person skilled in the art knows that, to ensure data consistency, a transaction needs to meet a consistency requirement. Therefore, in a process in which the first processing node 105 executes the transaction, a conflict detection mechanism is needed to determine whether the transaction that is being executed by the first processing node 105 conflicts with a transaction that is being executed by another processing node. Further, as shown in FIG. 2, in a process in which the first CPU 110 accesses the first transactional cache 120 according to the operation instruction 302 (refer to step 216), the first CPU 110 needs to further determine whether a transaction conflict occurs. When the transaction conflict occurs, execution of the operation instruction fails, and the first transactional cache 120 returns, to the first CPU 110, a response message used to indicate that the execution of the instruction fails. In addition, data related to the operation instruction and temporarily stored in the first transactional cache 120 is invalidated, and the first transactional cache 120 is disabled. After receiving the response message indicating that the execution of the instruction fails, the first CPU 110 may roll back to a start location of the transaction to re-execute the transaction. When no transaction conflict occurs, the first CPU 110 may normally access the first transactional cache 120 according to the operation instruction 302. For example, the first transactional cache 120 may return read data to the first CPU 110, or the first CPU 110 may store to-be-written data into the first transactional cache according to the operation instruction.

Figure 3:
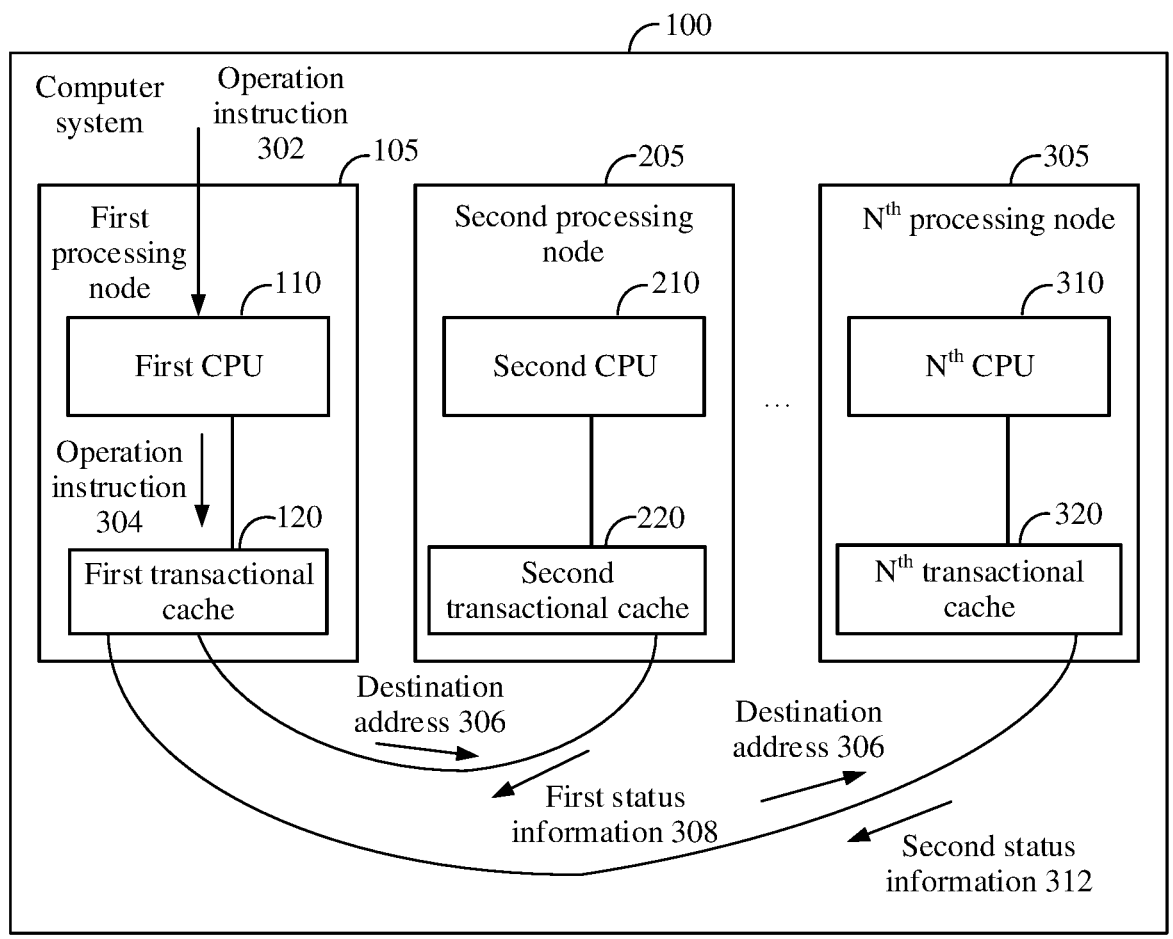
FIG. 3 is a signaling diagram of a transaction conflict detection method according to an embodiment of the present disclosure.
Figure 4:
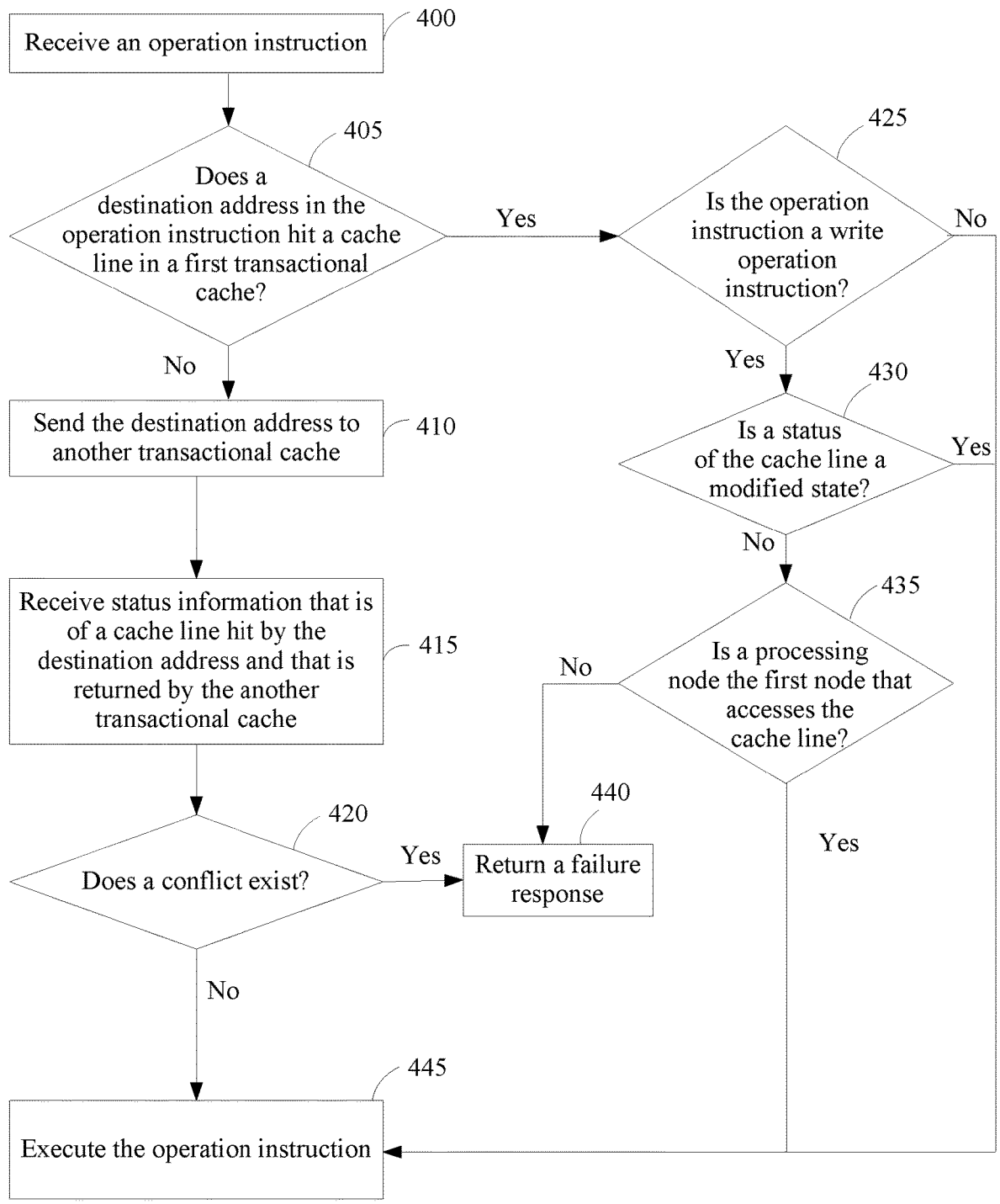
FIG. 4 is a flowchart of a transaction conflict detection method according to an embodiment of the present disclosure.

In this embodiment of the present disclosure, to resolve a concurrency problem on a shared storage multiprocessing chip, the dedicated first transactional cache 120 is used to implement transaction consistency. A transaction processing mechanism of the computer system 100 provided in the embodiment of the present disclosure is to be described below in detail with reference to FIG. 3 and FIG. 4. FIG. 3 is a signaling diagram of a transaction conflict detection method according to an embodiment of the present disclosure. FIG. 4 is a flowchart of a transaction conflict detection method according to an embodiment of the present disclosure. For clarity, FIG. 3 shows merely components participating in a process of processing an operation instruction in a transaction for accessing shared data and signaling between the components. For ease of description, the first processing node 105 is used as an example for description in this embodiment of the present disclosure. The transaction conflict detection method provided in this embodiment of the present disclosure may be further performed by the first transactional cache 120 in the first processing node 105. As shown in FIG. 4, the method may include the following steps.

In step 400, the first transactional cache 120 receives an operation instruction 304 sent by the first CPU 110. The operation instruction 304 carries a destination address 306, where the destination address 306 is an address in an internal memory to be accessed by the operation instruction 304. A person skilled in the art knows that, an operation instruction is transmitted between a CPU and a cache using a hardware control signal. For example, a hardware signal sent by the CPU may include a 32-bit address signal, a 32-bit data signal, a 1-bit read/write control signal, and a 1-bit chosen signal. In this embodiment of the present disclosure, when executing the operation instruction 302 (for example, a tran_load instruction) in the transaction for accessing the shared data, the first CPU 110 may set the 1-bit chosen signal to 1 to indicate that the first transactional cache 120 is to be used, and set the 1-bit read/write control signal to 0 to indicate that a current operation is a read operation. In addition, the first CPU 110 may add the destination address to the 32-bit address signal. In this manner, the first transactional cache 120 can receive the operation instruction 304 sent by the first CPU 110. It should be noted that, in this embodiment of the present disclosure, the operation instruction 302 obtained by the first CPU 110 may be an operation instruction at a software layer. In a process in which the first CPU 110 accesses the first transactional cache 120 according to the operation instruction 302, the operation instruction 304 sent to the first transactional cache 120 by the first CPU 110 is a control signal sent using hardware. It may be understood that the operation instruction 304 is a hardware expression of the operation instruction 302. Therefore, in this embodiment of the present disclosure, the operation instruction 302 and the operation instruction 304 may be considered as different expressions of a same instruction.

In step 405, the first transactional cache 120 determines whether the destination address 306 in the operation instruction 304 hits a cache line in the first transactional cache 120. During actual application, when data of the destination address 306 is cached in the cache line in the first transactional cache 120, the first transactional cache 120 determines that the destination address 306 in the operation instruction 304 hits the cache line in the first transactional cache 120. In other words, in this embodiment of the present disclosure, that the destination address 306 hits the cache line means that data of the destination address 306 is cached in the hit cache line, and the cached data is valid data. The first transactional cache 120 is configured to cache shared data accessed in a transaction that is currently executed by the first processing node, and the shared data is data that can be accessed by both the first processing node 105 and the other processing node. The other processing node may include at least one of the second processing node 205 to the $N^{th}$ processing node that are shown in FIG. 1. In this embodiment of the present disclosure, an address of data cached in the first transactional cache 120 is an internal memory address of the data in the internal memory. When the destination address 306 in the operation instruction 304 hits the cache line in the first transactional cache 120, it indicates that the shared data to be accessed by the operation instruction has been temporarily stored into the first transactional cache, and a current process of the first processing node has processed the shared data. In this case, the method goes to step 425. When the destination address 306 fails to hit the cache line in the first transactional cache 120, the method goes to step 410.

In step 410, the first transactional cache 120 sends the destination address 306 to another transactional cache. In this embodiment of the present disclosure, to avoid a transaction conflict caused when a transaction processed by the first processing node 105 and a transaction processed by the other processing node simultaneously access the destination address 306, the first transactional cache 120 may actively broadcast the destination address 306 to a transactional cache in the other processing node. Further, the first transactional cache 120 may send the destination address 306 to the transactional cache in the other processing node using the on-chip interconnect 130 between the processing nodes. For example, as shown in FIG. 3, in one case, the first transactional cache 120 may broadcast the destination address 306 to all processing nodes except the first processing node 105 in the computer system 100 in a broadcast manner. In another case, the first transactional cache 120 may send the destination address 306 to the second transactional cache 220 in the second processing node 205 and the $N^{th}$ transactional cache 320 in the $N^{th}$ processing node 305 using the on-chip interconnect 130.

In step 415, the first transactional cache 120 receives status information that is of the cache line hit by the destination address 306 and that is returned by the other transactional cache. The status information returned by the other transactional cache is used to indicate a status that is in the transactional cache in the other processing node and that is of the cache line hit by the destination address 306. A person skilled in the art may know that, the CPU usually accesses a cache using a cache line as an access unit, and performs conflict detection using a cache line as a granularity. It is considered that a transaction conflict occurs provided that operation addresses in mutually exclusive operation instructions hit a same cache line. A person in the art knows that, write instructions that are executed by different processing nodes are mutually exclusive operation instructions, a write instruction and a read instruction that are executed by different processing nodes are also mutually exclusive operation instructions, and read instructions that are executed by different processing nodes are not mutually exclusive operation instructions. Generally, a size of a cache line in a cache is 64 bytes. Therefore, such a transaction conflict detection manner causes misdetection because of an excessively coarse granularity. In this embodiment of the present disclosure, the first CPU 110 still accesses the first transactional cache 120 using a cache line as a granularity. However, to improve detection efficiency, in this embodiment of the present disclosure, the first transactional cache 120 is specially configured to cache the shared data accessed in the transaction processed by the first processing node 105. An amount of data cached in the first transactional cache 120 is smaller than an amount of data cached in an existing cache, a relatively small amount of data needs to be traversed in a conflict detection process, and therefore detection efficiency is higher. In addition, in this embodiment of the present disclosure, to improve precision of conflict detection, each cache line may be set to be smaller. For example, a word may be set as a cache line such that transaction conflict detection can be performed using a word as a granularity. A word is generally 4 bytes, and certainly, word lengths defined by different systems are not completely the same. It may be understood that, implementing conflict detection using one word as a granularity is merely a manner of improving detection precision. During actual application, several words may also be used as a cache line. In this embodiment of the present disclosure, a specific size of each cache line is not limited, provided that the size is smaller than a size of a cache line in the other approaches. A size of the cache line in the first transactional cache 120 may be determined based on data bit widths of the first transactional cache 120 and the first CPU 110. For example, if the data bit width of the first CPU 110 is 32 bits, and the data bit width of the first transactional cache 120 is 40 bits (of which 32 bits are a data bit, and 8 bits are status bits), the cache line in the first transactional cache 120 may be set to 40 bits.

As shown in FIG. 3, in this step, after the first transactional cache 120 broadcasts the destination address 306 to the transactional cache in the other processing node, if the data of the destination address 306 is cached in the second processing node 205, the second transactional cache 220 in the second processing node 205 returns, to the first transactional cache 120, status information (for example, first status information 308 in FIG. 3) that is in the second transactional cache 220 and that is of a cache line corresponding to the destination address. Similarly, if the data of the destination address is cached in the $N^{th}$ processing node 305, the $N^{th}$ transactional cache 320 in the $N^{th}$ processing node 305 returns, to the first transactional cache 120, status information (for example, second status information 312 in FIG. 3) that is in the $N^{th}$ transactional cache 320 and that is of the cache line corresponding to the destination address. Both the first status information 308 and the second status information 312 may be an invalid state, a modified state, or a shared state described below. It may be understood that, if the data of the destination address is not cached in a processing node, the processing node may not return a response message to the first transactional cache 120 such that an amount of information transmitted between nodes can be reduced.

Figure 5:
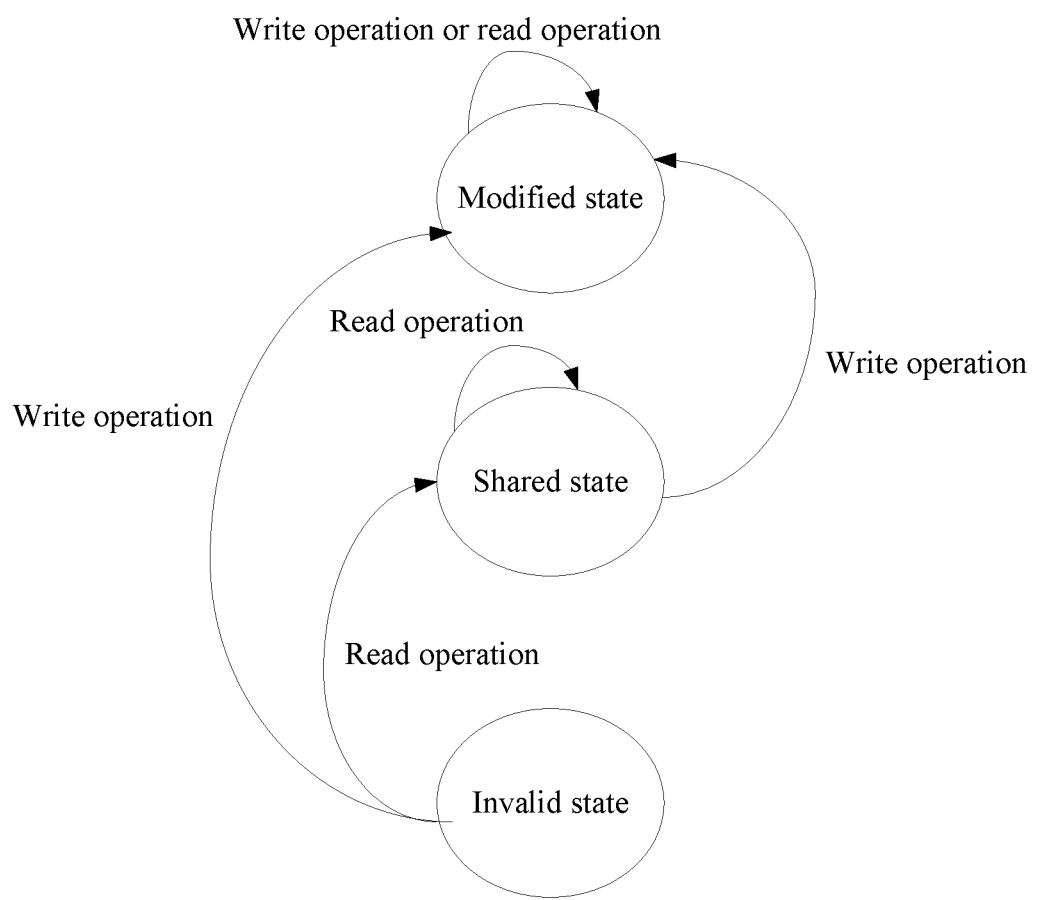
FIG. 5 is a schematic diagram of a status of a cache line according to an embodiment of the present disclosure.

In this embodiment of the present disclosure, to detect a transaction conflict, each cache line in a transactional cache includes status information. The status information is used to indicate an access status that is in the transactional cache and that is of shared data cached in the cache line. FIG. 5 is a schematic diagram of a status of a cache line according to an embodiment of the present disclosure. As shown in FIG. 5, each cache line in the transactional cache may have the following three states, an invalid state (I), a modified state (M), and a shared state (S). The invalid state is used to indicate that data of an internal memory address corresponding to the cache line is not in the transactional cache or data cached in the cache line is invalid data. The modified state is used to indicate that the data in the cache line is being modified by a local processing unit. In this embodiment of the present disclosure, the local processing unit is a processing unit that belongs to a same processing node as the transactional cache. In other words, the modified state is used to indicate that the data in the cache line is being modified by the processing node. The shared state is used to indicate that the data in the cache line is consistent with the data in the internal memory. As shown in FIG. 5, when initialized, all cache lines in the transactional cache are in the invalid state. When the local processing unit performs a read operation on a cache line, the status of the cache line is changed to the shared state. When the local processing unit performs a write operation on a cache line in the transactional cache, the status of the cache line is updated to the modified state. When the cache line is in the shared state, a read operation of the local processing unit does not change the status of the cache line, and the cache line still remains in the shared state. However, when the cache line is in the shared state, if the local processing unit performs a write operation on the cache line that is in the shared state, the cache line is updated from the shared state to the modified state. When the cache line is in the modified state, regardless of whether the local processing unit performs a read operation or a write operation on the cache line, the cache line still remains in the modified state.

Figure 6:
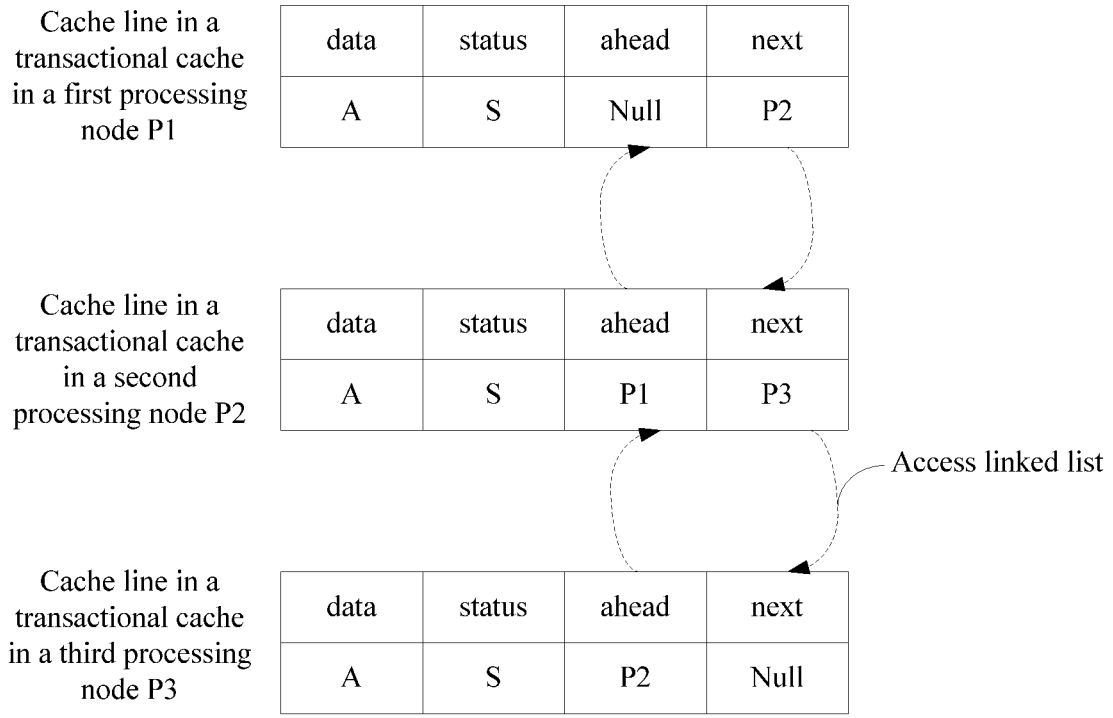
FIG. 6 is a schematic structural diagram of a cache line according to an embodiment of the present disclosure.

To describe the technical solutions of the present disclosure clearly, the following describes a data structure of the cache line in the transactional cache provided in this embodiment of the present disclosure. FIG. 6 is a schematic structural diagram of a cache line according to an embodiment of the present disclosure. As shown in FIG. 6, each cache line in a transactional cache in each processing node shown in FIG. 1 includes the following information of data, status, and pointer information of another processing node that accesses the cache line. A "data" field is used to indicate content of the cache line. Further, the "data" field is used to indicate shared data in an internal memory address accessed in a transaction execution process. A "status" field is used to indicate a status of the cache line, where the status of the cache line includes the invalid state, the modified state, or the shared state described above. The pointer information of the other processing node that accesses the shared data in the cache line may be indicated using two fields an "ahead" field and a "next" field, where the "ahead" field is used to indicate information about another processing node that accesses the shared data in the cache line before the processing node, and the "next" field is used to indicate information about another processing node that accesses the shared data in the cache line after the processing node. In this embodiment of the present disclosure, an access linked list may be obtained based on the "ahead" field and the "next" field, where the access linked list is used to indicate a sequence in which different processing nodes access same shared data. Further, because the read instructions are not mutually exclusive, in this embodiment of the present disclosure, the access linked list is used to indicate the sequence in which the different processing nodes read the same shared data.

For example, as shown in FIG. 6, data in a cache line in a first processing node P1 is data A, a status of the cache line is a shared S state, an "ahead" field is null, and a "next" field points to a second processing node P2, data in a cache line in the second processing node P2 is also the data A, a status of the cache line is the shared S state, an "ahead" field points to the first processing node P1, and a "next" field points to a third processing node P3, and data in a cache line in the third processing node P3 is also the data A, a status of the cache line is also the shared S state, an "ahead" field points to the second processing node P2, and a "next" field is null. Therefore, it can be learned from FIG. 6 that, transactions currently processed by the first processing node P1, the second processing node P2, and the third processing node P3 all access the data A. In addition, an access linked list of the data A can be obtained based on the "ahead" field and the "next" field in each cache line, and it can be determined, based on the access linked list of the data A, that a sequence in which the three processing nodes access the data A is P1->P2->P3. Therefore, it can be learned that P1 is the first processing node that accesses the data A among the processing nodes that are accessing the data A. It may be understood that, in this embodiment of the present disclosure, there is a conflict between a read operation and a write operation on a same piece of shared data, and a plurality of processing nodes can simultaneously read the same piece of shared data, but when the plurality of processing nodes access the same piece of shared data, a read operation and a write operation cannot coexist. Therefore, the access linked list in this embodiment of the present disclosure is actually used to indicate a sequence in which the plurality of processing nodes perform read operations on the same piece of shared data. Each piece of shared data may have an access linked list.

In this embodiment of the present disclosure, after the other transactional cache receives the destination address sent by the first transactional cache 120, the other transactional cache may determine whether the shared data of the destination address is cached in the other transactional cache. For ease of description, in this embodiment of the present disclosure, that the second transactional cache 220 in the second processing node 205 is one of the other transactional caches is used as an example for description. After the second transactional cache 220 receives the destination address 306 sent by the first transactional cache 120, the second transactional cache 220 may determine whether the shared data of the destination address 306 is cached in the second transactional cache 220. In one case, if the data of the destination address 306 is not found in the second transactional cache 220, it indicates that a current process of the second processing node 205 has not accessed the data of the destination address 306. In this case, the second transactional cache 220 may not respond to the first transactional cache 120. In another case, if the data of the destination address 306 is found in the second transactional cache 220, it indicates that a current process of the second processing node 205 has accessed the data of the destination address. In this case, the second transactional cache 220 needs to further return, to the first transactional cache 120, a status that is in the second transactional cache 220 and that is of the cache line hit by the destination address 306. The second transactional cache 220 may determine, based on a "status" field in the cache line hit by the destination address, the status that is in the second transactional cache and that is of the cache line hit by the destination address, and return, to the first transactional cache 120, the status that is in the second transactional cache 220 and that is of the cache line corresponding to the destination address. As mentioned above, the status of the cache line in the second transactional cache may be the invalid state, the modified state, or the shared state.

During actual application, it may be that only when finding a cache line corresponding to the destination address, the other transactional cache returns status information of the cache line corresponding to the destination address to the first transactional cache 120. It may be understood that, there may be a plurality of other transactional caches that return the status information of the cache line corresponding to the destination address to the first transactional cache 120. If a transactional cache has not found a cache line corresponding to the destination address, in one case, the transactional cache may not respond to the first transactional cache 120, or in another case, the transactional cache may return, to the first transactional cache 120, a response message used to indicate the "invalid" state.

In step 420, the first transactional cache 120 determines, based on the status information returned by the transactional cache in the other processing node, whether the operation instruction conflicts with an operation instruction that is being executed by the other processing node. It may be understood that, after the first transactional cache 120 sends the destination address to the transactional cache in the other processing node, if the first transactional cache 120 has not received, within a preset time, the status information that is of the cache line corresponding to the destination address 306 and that is returned by the other transactional cache, the first transactional cache 120 determines that the operation instruction does not conflict with the operation instruction that is being executed by the other processing node. Alternatively, if the first transactional cache 120 has received, within the preset time, the status information that is of the cache line corresponding to the destination address and that is returned by the other transactional cache, the first transactional cache 120 needs to determine, based on at least one piece of status information received by the first transactional cache 120, whether the operation instruction conflicts with the operation instruction that is being executed by the other processing node. For example, as shown in FIG. 3, the first transactional cache 120 may determine, based on the first status information 308 returned by the second transactional cache 220, whether the operation instruction 304 conflicts with an operation instruction that is being executed by the second processing node. Similarly, the first transactional cache 120 may also determine, based on the second status information 312 returned by the $N^{th}$ transactional cache 320, whether the operation instruction 304 conflicts with an operation instruction that is being executed by the $N^{th}$ processing node 305.

Further, when all the status information received by the first transactional cache 120 is status information indicating the "invalid" state, the first transactional cache 120 determines that the operation instruction 304 does not conflict with the operation instruction that is being executed by the other processing node. When the status information received by the first transactional cache 120 includes status information indicating the "modified" state, the first transactional cache 120 determines that the operation instruction 304 conflicts with the operation instruction that is being executed by the other processing node. When the status information received by the first transactional cache 120 includes only status information indicating the invalid state and the shared state, if the operation instruction is a read operation instruction, the first transactional cache 120 determines that the operation instruction 304 does not conflict with the operation instruction that is being executed by the other processing node, or if the operation instruction is a write operation instruction, the first transactional cache 120 determines that the operation instruction 304 conflicts with the operation instruction that is being executed by the other processing node.

When the first transactional cache 120 determines, based on the status information returned by the transactional cache in the other processing node, that the operation instruction conflicts with the operation instruction that is being executed by the other processing node, the method goes to step 440. When the first transactional cache 120 determines, based on the status information returned by the transactional cache in the other processing node, that the operation instruction does not conflict with the operation instruction that is being executed by the other processing node, the method goes to step 445.

In step 440, the first transactional cache 120 returns a failure response message to the first CPU 110, where the failure response message is used to indicate that execution of the operation instruction fails. In step 445, the first transactional cache 120 executes the operation instruction. When the operation instruction is a read operation instruction, the first transactional cache 120 reads data from the internal memory 130 based on a destination address in the read operation instruction, and returns, to the first CPU 110, the data read from the internal memory 130 based on the destination address. The first transactional cache 120 may send the read instruction to the internal memory 130 based on the destination address, store the data read from the internal memory 130 into a cache line, return the data to the first CPU 110, and set a status of the cache line to the "shared" state. When the operation instruction 304 is a write operation instruction, and the write operation instruction 304 carries to-be-written data, the first transactional cache 120 may store the to-be-written data into the first transactional cache 120. The first transactional cache 120 may find a corresponding cache line in the first transactional cache 120 based on the destination address 306, store the data into the cache line corresponding to the destination address 306, and update a status of the cache line to the "modified" state.

If in step 405, the first transactional cache 120 determines that the operation instruction hits the cache line in the first transactional cache 120, the method goes to step 425. In step 425, the first transactional cache 120 determines whether the operation instruction is a write operation instruction. When the operation instruction is the write operation instruction, the method goes to step 430, or when the operation instruction is not the write operation instruction but a read operation instruction, the method goes to step 445. In step 445, the first transactional cache 120 reads the data from the internal memory 130 based on the destination address in the operation instruction, and returns the read data to the first CPU 110.

In step 430, the first transactional cache 120 determines whether a status of the cache line hit by the destination address is the modified state, where the modified state is used to indicate that the first transactional cache 120 has performed a write operation on the data in the cache line in an execution process of the transaction. Further, when the first transactional cache 120 determines that the operation instruction hits the cache line in the first transactional cache 120 and the operation instruction is the write operation instruction, the first transactional cache 120 may obtain the status of the cache line hit by the destination address. If the status of the cache line hit by the destination address is the modified state, the method goes to step 445: The first transactional cache 120 executes the operation instruction, performs a write operation on the cache line hit by the destination address, and keeps the cache line in the modified state. If the status of the cache line is not the "modified" state but the "shared" state, the method goes to step 435. That the status of the cache line is the "shared" state indicates that the first transactional cache 120 has performed a read operation on the shared data in the cache line in the execution process of the transaction.

In step 435, the first transactional cache 120 further determines, based on the access linked list, whether the first processing node 105 is the first processing node that accesses the shared data among processing nodes that access the shared data. It may be understood that, in this embodiment of the present disclosure, the cache line is used to cache accessed shared data, and the access linked list is obtained based on the "ahead" field and the "next" field in the cache line. The access linked list is used to indicate a sequence in which different processing nodes access the shared data. Therefore, if the "ahead" field in the cache line is null, or the first processing node 105 is a head node of the access linked list of the shared data, the first transactional cache 120 determines that the first processing node 105 is the first processing node that accesses the shared data among the processing nodes that are accessing the shared data. When the first transactional cache 120 determines that the first processing node 105 is the first processing node that accesses the shared data among the processing nodes that access the shared data, the method goes to step 445: The first transactional cache 120 executes the operation instruction. Further, the first transactional cache 120 needs to change the status of the cache line hit by the destination address to the "modified" state, instruct another processing node in which the shared data is cached to suspend processing a current transaction, and write data carried in the operation instruction to the cache line corresponding to the destination address. When the first transactional cache 120 determines that the first processing node 105 is not the first processing node that accesses the shared data among the processing nodes that access the shared data, the method goes to step 440: The first transactional cache 120 returns, to the first CPU 110, a response message indicating that the execution of the operation instruction fails. According to this manner, a processing sequence of transactions running on different processing nodes that access same shared data in a computer system can be ensured such that access of the processing nodes can be normally performed in an access sequence, thereby avoiding a problem that a processing node that accesses the shared data earlier cannot normally process a transaction because the shared data is modified by a processing node that accesses the shared data later.

For example, if the operation instruction 304 is a write operation instruction, and the destination address 306 in the operation instruction 304 hits the first transactional cache 120, it indicates that a current process of the first processing node 105 has accessed the shared data of the destination address 306 in the operation instruction 304. If the status of the cache line hit by the destination address 306 in the operation instruction 304 is the shared state, it indicates that the current process being executed by the first processing node 105 has read the shared data in the cache line. Therefore, when the first processing node 105 needs to rewrite the shared data in the cache line according to the operation instruction 304, the first transactional cache 120 needs to first determine, based on the access linked list of the shared data, whether the first processing node 105 is the first processing node that accesses the shared data among the processing nodes that are accessing the shared data. If the first processing node 105 is the first processing node among the processing nodes that are accessing the shared data, it indicates that the first processing node 105 is entitled to preferentially process the shared data of the destination address 306. In this case, the first processing node 105 may change the status of the cache line hit by destination address 306 in the operation instruction 304 from the "shared" state to the "modified" state, and send a notification message to the other processing node. The notification message is used to instruct a processing node in which the shared data corresponding to the destination address 306 is cached to suspend a current service, and write, according to the operation instruction 304, the to-be-written data into the cache line hit by the destination address 306 in the operation instruction 304. According to this manner, even if the first processing node 105 modifies the shared data of the destination address 306, an error does not occur in data read by the other processing node, thereby avoiding data inconsistency.

According to the conflict detection method provided in this embodiment of the present disclosure, a transactional cache that is specially configured to cache shared data to be accessed by a current transaction is provided in a processing node such that transaction conflict detection does not need to be performed on an operation instruction that does not access the shared data, and system power consumption during operation instruction processing of a system is reduced. In addition, in comparison with an existing cache, the transactional cache stores a relatively small amount of data, and a relatively small amount of data needs to be traversed in a conflict detection process such that detection efficiency can be improved. In addition, in this embodiment of the present disclosure, the cache line in the transactional cache is set to be relatively small, and a conflict detection granularity is relatively fine such that an implementation process of transaction conflict detection in the computer system provided in this embodiment of the present disclosure has higher detection precision. This is more beneficial to performance improvement of the computer system.

Further, in this embodiment of the present disclosure, the transactional cache can actively broadcast a destination address in an operation instruction that is being processed by the transactional cache to the other transactional cache, and determine, based on a status that is of a cache line corresponding to the destination address and that is returned by the other transactional cache, whether a transaction conflict occurs. Therefore, the other processing node does not need to monitor an address bus to determine whether a transaction conflict occurs in a transaction that is being executed by the other processing node such that power consumption caused in monitoring a useless address is reduced. This is more beneficial to system performance improvement.

Figure 7:
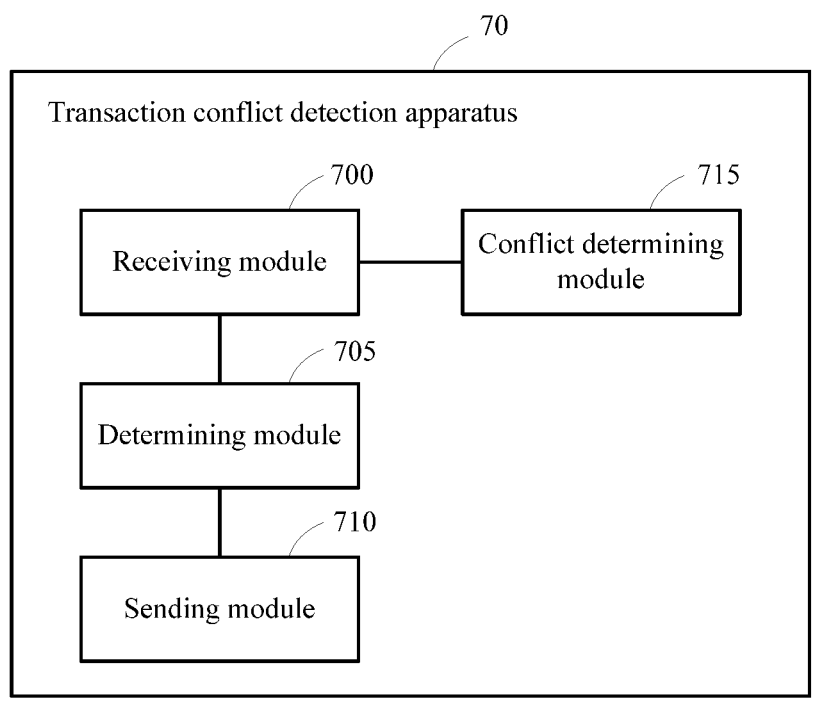
FIG. 7 is a schematic structural diagram of a transaction conflict detection apparatus according to an embodiment of the present disclosure.

FIG. 7 is a schematic structural diagram of a transaction conflict detection apparatus 70 according to an embodiment of the present disclosure. As shown in FIG. 7, the apparatus 70 may be applied to a multi-core computer system that includes a plurality of processing nodes. For example, the apparatus may be applied to the computer system shown in FIG. 1. Each processing node in the multi-core computer system includes a processing unit, a normal cache, and a transactional cache. The processing unit may be a component such as a CPU or a processor core that has a computing capability and a control capability. The transactional cache is configured to cache shared data of a transaction that is being processed, and the shared data is data that can be accessed by at least two of the plurality of processing nodes. A normal cache and a transactional cache in a same processing node separately communicate with a processing unit in the processing node using different data channels. Further, the transaction conflict detection apparatus provided in this embodiment of the present disclosure may be applied to a transactional cache in each processing node. For ease of description, in this embodiment of the present disclosure, that the transaction conflict detection apparatus 70 is applied to the first transactional cache 120 in FIG. 1 is used as an example for description. As shown in FIG. 7, the transaction conflict detection apparatus 70 may include a receiving module 700 configured to receive an operation instruction sent by a first processing unit, where the operation instruction carries a destination address, and the destination address is an address in an internal memory to be accessed by the operation instruction, a determining module 705 configured to determine that the destination address fails to hit a cache line in the first transactional cache, where the first transactional cache is configured to cache shared data of a transaction that is being processed by a first processing node, and the shared data is data that can be accessed by both the first processing node and the second processing node, a sending module 710 configured to send the destination address to a transactional cache in the second processing node, where the receiving module 700 is further configured to receive status information that is of a cache line hit by the destination address and that is returned by the transactional cache in the second processing node, where the shared data is cached in the cache line hit by the destination address, and the status information is used to indicate an access status of the shared data in the transactional cache in the second processing node, and a conflict determining module 715 configured to determine, based on the status information, whether the operation instruction conflicts with an operation instruction that is being executed by the second processing node.

In this embodiment of the present disclosure, the first transactional cache may include a plurality of cache lines, and a size of each cache line may be set to one word.

In one case, when the status information received by the first transactional cache is status information indicating a modified state, the conflict determining module 715 is further configured to determine that the operation instruction conflicts with the operation instruction that is being executed by the second processing node, where the modified state is used to indicate that the shared data is being modified by the second processing node.

In another case, when the operation instruction is a read operation instruction, and the status information is status information indicating a shared state, the conflict determining module 715 is further configured to determine that the operation instruction does not conflict with the operation instruction that is being executed by the second processing node, where the shared state is used to indicate that the shared data is consistent with data in the internal memory.

In another case, when the operation instruction is a write operation instruction, and the status information is status information indicating a shared state, the conflict determining module 715 is further configured to determine that the operation instruction conflicts with the operation instruction that is being executed by the second processing node, where the shared state is used to indicate that the shared data is consistent with data in the internal memory.

Figure 8:
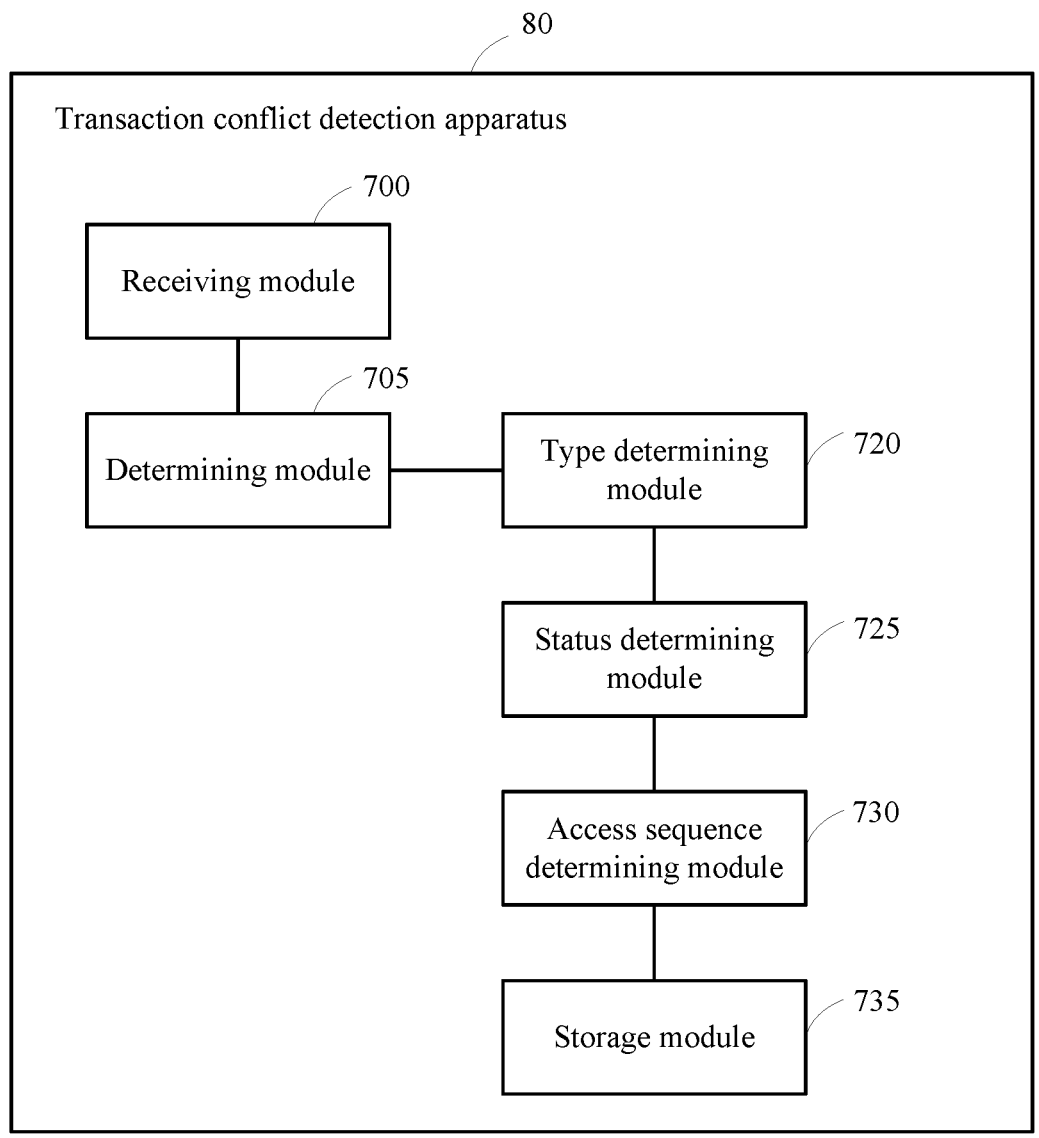
FIG. 8 is a schematic structural diagram of another transaction conflict detection apparatus according to an embodiment of the present disclosure.

FIG. 8 is a schematic structural diagram of another transaction conflict detection apparatus 80 according to an embodiment of the present disclosure. As shown in FIG. 8, the apparatus may be applied to a multi-core computer system that includes a plurality of processing nodes. For example, the apparatus may be applied to the computer system shown in FIG. 1. Each processing node in the multi-core computer system includes a processing unit, a normal cache, and a transactional cache. The processing unit may be a component such as a CPU or a processor core that has a computing capability and a control capability. The transactional cache is configured to cache shared data of a transaction that is being processed by the processing unit, and the shared data is data that can be accessed by at least two of the plurality of processing nodes. A normal cache and a transactional cache in a same processing node separately communicate with a processing unit in the processing node using different data channels. Further, the transaction conflict detection apparatus 80 provided in this embodiment of the present disclosure may be applied to a transactional cache in each processing node. For ease of description, in this embodiment of the present disclosure, that the transaction conflict detection apparatus 80 is applied to the first transactional cache 120 in FIG. 1 is used as an example for description. As shown in FIG. 8, the transaction conflict detection apparatus 80 may include a receiving module 700 configured to receive an operation instruction sent by a first processing unit, where the operation instruction carries a destination address, and the destination address is an address in an internal memory to be accessed by the operation instruction, a determining module 705 configured to determine that the destination address hits a cache line in the first transactional cache, where the shared data is cached in the hit cache line, a type determining module 720 configured to determine that the operation instruction is a write operation instruction, a status determining module 725 configured to determine that a status of the cache line hit by the destination address is a shared state, where the shared state is used to indicate that the shared data is consistent with data in the internal memory, an access sequence determining module 730 configured to determine that the first processing node is the first processing node that accesses the shared data, and a storage module 735 configured to write to-be-written data into the cache line according to the operation instruction.

In this embodiment of the present disclosure, the first transactional cache may include a plurality of cache lines, and a size of each cache line may be set to one word.

Further, the access sequence determining module 730 may determine, based on an access linked list of the cache line, that the processing node is the first processing node that accesses the cache line, where the access linked list is used to indicate a sequence in which the plurality of processing nodes read the shared data.

Figure 9:
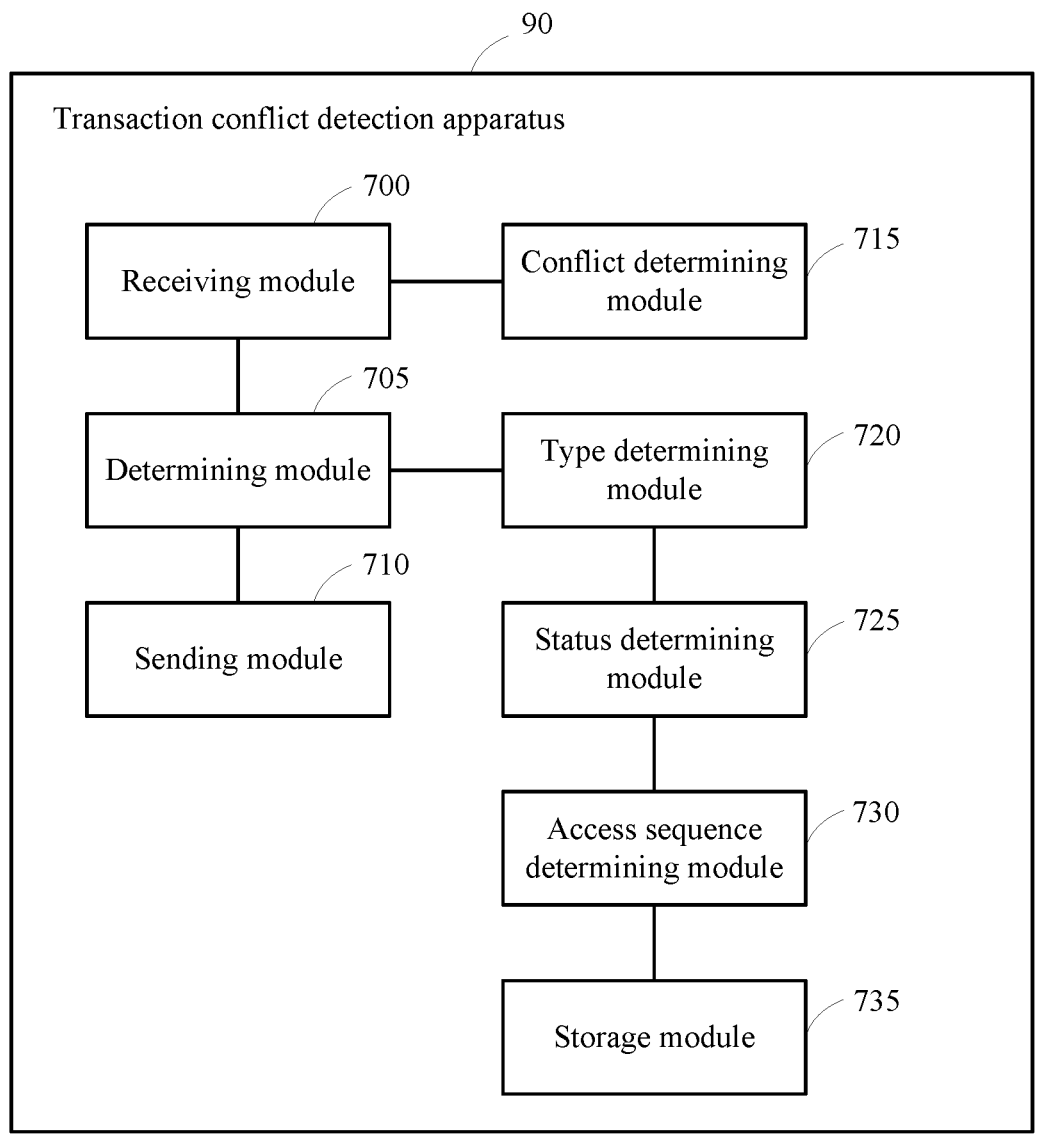
FIG. 9 is a schematic structural diagram of another transaction conflict detection apparatus according to an embodiment of the present disclosure.

It should be noted that, during actual application, the functional modules shown in FIG. 7 and FIG. 8 may be located in a same transaction conflict detection apparatus, which is further shown in FIG. 9. FIG. 9 is a schematic structural diagram of another transaction conflict detection apparatus according to an embodiment of the present disclosure. In the transaction conflict detection apparatus 90 shown in FIG. 9, in one case, the determining module 705 may be configured to determine that the destination address fails to hit a cache line in the first transactional cache. In another case, the determining module 705 may also be configured to determine that the destination address hits a cache line in the first transactional cache, where the shared data is cached in the hit cache line. For descriptions of other modules in FIG. 9, refer to specific descriptions of the modules in FIG. 7 and FIG. 8, and details are not described herein again.

The transaction conflict detection apparatuses 70 to 90 provided in the embodiments of the present disclosure may perform the conflict detection method described in the embodiment in FIG. 4. For detailed descriptions of functions of the modules, refer to descriptions in the foregoing embodiments, and details are not described herein again.

An embodiment of the present disclosure further provides a computer program product for data processing, including a computer readable storage medium storing program code, where an instruction included in the program code is used to perform the method procedure described in any one of the foregoing method embodiments. A person of ordinary skill in the art may understand that the foregoing storage medium includes any non-transitory machine-readable medium capable of storing program code, such as a universal serial bus (USB) flash drive, a removable hard disk, a magnetic disk, an optical disc, a RAM, a solid state disk (SSD), or another non-volatile memory.

It should be noted that the embodiments provided in this application are merely examples. A person skilled in the art may clearly know that, for convenience and conciseness of description, in the foregoing embodiments, the embodiments emphasize different aspects, and for a part not described in detail in an embodiment, refer to related descriptions in another embodiment. The features disclosed in the embodiments of the present disclosure, claims, and the accompanying drawings may exist independently or exist in a combination. Features described in a hardware form in the embodiments of the present disclosure may be executed using software, and vice versa, which is not limited herein.

What is claimed is:

1. A transaction conflict detection method applied to a computer system comprising a first processing node and a second processing node, wherein the first processing node comprises a first processor and a first transactional cache coupled to the first processor, and wherein the method comprises:

receiving, by the first transactional cache, a first operation instruction from the first processor, wherein the first operation instruction carries a first destination address, and wherein the first destination address comprises an address in an internal memory to be accessed by the first operation instruction;

sending, by the first transactional cache, the first destination address to a second transactional cache in the second processing node when the first destination address fails to hit a cache line in the first transactional cache, wherein the first transactional cache is configured to cache shared data of a transaction processed by the first processing node, and wherein the shared data comprises data that can be accessed by both the first processing node and the second processing node;

receiving, by the first transactional cache, status information of a cache line hit by the first destination address from the second transactional cache, wherein the shared data is cached in the cache line hit by the first destination address, wherein the status information indicates an access status of the shared data in the second transactional cache, and wherein the status information comprises an invalid state or a modified state;

determining, by the first transactional cache based on the status information, whether the first operation instruction conflicts with a second operation instruction executed by the second processing node;

obtaining a third operation instruction in the transaction, wherein the third operation instruction carries a second destination address comprising an address in an internal memory to be accessed by the third operation instruction;

accessing the first transactional cache when the third operation instruction comprises an instruction of a transaction for accessing the shared data;

determining that the second destination address hits the cache line in the transaction cache;

determining that the third operation instruction is a write operation instruction;

determining that a status of the cache line hit by the third operation instruction is a shared state indicating that the shared data is consistent with data in the internal memory; and writing to-be-written data into the cache line according to the third operation instruction when the first processing node is the earliest processing node that accesses the shared data.

2. The method of claim 1, wherein the determining whether the first operation instruction conflicts with the second operation instruction comprises determining, by the first transactional cache, that the first operation instruction conflicts with the second operation instruction when the status information received by the first transactional cache indicating a modified state, and wherein the modified state indicates that the shared data is modified by the second processing node.

3. The method of claim 1, wherein the determining whether the first operation instruction conflicts with the second operation instruction comprises determining, by the first transactional cache, that the first operation instruction does not conflict with the second operation instruction when the first operation instruction comprises a read operation instruction, wherein the status information indicates a shared state, and wherein the shared state indicates that the shared data is consistent with data in the internal memory.

4. The method of claim 1, wherein the determining whether the first operation instruction conflicts with the second operation instruction comprises determining, by the first transactional cache, that the first operation instruction conflicts with the second operation instruction when the first operation instruction comprises a write operation instruction, wherein the status information indicates a shared state, and wherein the shared state indicates that the shared data is consistent with data in the internal memory.

5. The method of claim 1, wherein a size of the cache line in the first transactional cache comprises one word.

6. A processing node comprising:
a processor configured to:
obtain a first operation instruction in a transaction, wherein the first operation instruction carries a first destination address comprising an address in an internal memory to be accessed by the first operation instruction; and access a first transactional cache configured to cache shared data of a transaction processed by the processing node when the first operation instruction comprises an instruction of a transaction for accessing shared data, wherein the shared data comprises data that can be accessed by both the processing node and another processing node; and the first transactional cache coupled to the processor using a first interface and configured to:

send the first destination address to a second transactional cache in the other processing node when the first destination address fails to hit a cache line in the first transactional cache;

receive status information of a cache line hit by the first destination address from the second transactional cache, wherein the shared data is cached in the cache line hit by the first destination address, wherein the status information indicates an access status of the shared data in the second transactional cache, and wherein the status information comprises an invalid state or a modified state; and determine, based on the status information, whether the first operation instruction conflicts with a second operation instruction executed by the other processing node, wherein the processor is further configured to:
obtain a third operation instruction in the transaction, wherein the third operation instruction carries a second destination address comprising an address in an internal memory to be accessed by the third operation instruction; and access the first transactional cache when the third operation instruction comprises an instruction of a transaction for accessing the shared data, and wherein the first transactional cache is further configured to:

determine that the second destination address hits the cache line in the transaction cache;

determine that the third operation instruction is a write operation instruction;

determine that a status of the cache line hit by the third operation instruction is a shared state indicating that the shared data is consistent with data in the internal memory; and write to-be-written data into the cache line according to the third operation instruction when the processing node is the earliest processing node that accesses the shared data.

7. The processing node of claim 6, further comprising a normal cache coupled to the processor using a second interface, wherein the first interface and the second interface are different communications interfaces, wherein the normal cache is configured to cache data processed by the processing node except the shared data of the transaction, and wherein the normal cache is a non-transactional cache.

8. The processing node of claim 6, wherein the first transactional cache is further configured to determine that the first operation instruction conflicts with the second operation instruction when the status information indicates a modified state, and wherein the modified state indicates that the shared data is modified by the other processing node.

9. The processing node of claim 6, wherein the first transactional cache is further configured to determine that the first operation instruction does not conflict with the second operation instruction when the first operation instruction comprises a read operation instruction, wherein the status information indicates a shared state, and wherein the shared state indicates that the shared data is consistent with data in the internal memory.

10. The processing node of claim 6, wherein the first transactional cache is further configured to determine that the first operation instruction conflicts with the second operation instruction when the first operation instruction comprises a write operation instruction, wherein the status information indicates a shared state, and wherein the shared state indicates that the shared data is consistent with data in the internal memory.

11. The processing node of claim 6, wherein a size of the cache line in the first transactional cache comprises one word.

12. The processing node of claim 6, wherein the processor is further configured to determine, based on an access linked list of the cache line, that the processing node accesses the cache line, and wherein the access linked list indicates a sequence in which a plurality of processing nodes read the shared data.

13. A computer system comprising:
a second processing node; and
a first processing node coupled to the second processing node and configured to:
obtain a first operation instruction in a transaction, wherein the first operation instruction carries a first destination address comprising an address in an internal memory to be accessed by the first operation instruction;
access a first transactional cache in the first processing node when the first operation instruction comprises an instruction of a transaction for accessing shared data, wherein the shared data comprises data that can be accessed by both the first processing node and the second processing node, and wherein the first transactional cache is configured to cache shared data of a transaction processed by the first processing node;
send the first destination address to a second transactional cache in the second processing node when the first destination address fails to hit a cache line in the first transactional cache;
receive status information of a cache line hit by the first destination address from the second transactional cache, wherein the shared data is cached in the cache line hit by the first destination address, wherein the status information indicates an access status of the shared data in the second transactional cache, and wherein the status information comprises an invalid state or a modified state;
determine, based on the status information, whether the first operation instruction conflicts with a second operation instruction executed by the second processing node;
obtain a third operation instruction in the transaction, wherein the third operation instruction carries a second destination address comprising an address in an internal memory to be accessed by the third operation instruction;
access the first transactional cache when the third operation instruction comprises an instruction of a transaction for accessing the shared data;
determine that the second destination address hits the cache line in the transaction cache;
determine that the third operation instruction is a write operation instruction;
determine that a status of the cache line hit by the third operation instruction is a shared state indicating that the shared data is consistent with data in the internal memory; and
write to-be-written data into the cache line according to the third operation instruction when the first processing node is the earliest processing node that accesses the shared data.

14. The computer system of claim 13, wherein the first processing node comprises:
a processor;
a normal cache coupled to the processor using a second interface and configured to cache data processed by the first processing node except the shared data of the transaction, wherein the normal cache is a non-transactional cache; and
the first transactional cache coupled to the processor using a first interface,
wherein the first interface and the second interface are different communications interfaces.

15. The computer system of claim 13, wherein the first processing node is configured to determine that the first operation instruction conflicts with the second operation instruction when the status information comprises status information indicating a modified state, and wherein the modified state indicates that the shared data is modified by the second processing node.

16. The computer system of claim 13, wherein the first processing node is configured to determine that the first operation instruction does not conflict with the second operation instruction when the first operation instruction comprises a read operation instruction, wherein the status information indicates a shared state, and wherein the shared state indicates that the shared data is consistent with data in the internal memory.

17. The computer system of claim 13, wherein the first processing node is configured to determine that the first operation instruction conflicts with the second operation instruction when the first operation instruction comprises a write operation instruction, wherein the status information indicates a shared state, and wherein the shared state indicates that the shared data is consistent with data in the internal memory.

18. The computer system of claim 13, wherein a size of the cache line in the first transactional cache comprises one word.

* * * * *